Jan. 1, 1963 R. NIPKEN 3,071,024
MULTIPARTITE CRANKS
Filed Dec. 19, 1960 3 Sheets-Sheet 1

INVENTOR
Rudolf Nipken
BY
Michael S. Striker
Attorney

Jan. 1, 1963   R. NIPKEN   3,071,024
MULTIPARTITE CRANKS

Filed Dec. 19, 1960   3 Sheets-Sheet 2

INVENTOR
Rudolf Nipken
BY
Michael S. Striker
Attorney

Jan. 1, 1963  R. NIPKEN  3,071,024
MULTIPARTITE CRANKS
Filed Dec. 19, 1960  3 Sheets–Sheet 3

INVENTOR
Rudolf Nipken
BY
Michael S. Striker
attorney

United States Patent Office 3,071,024
Patented Jan. 1, 1963

3,071,024
MULTIPARTITE CRANKS
Rudolf Nipken, 242 Friesdorfer Strasse,
Bad Godesberg, Germany
Filed Dec. 19, 1960, Ser. No. 76,556
Claims priority, application Germany Dec. 23, 1959
10 Claims. (Cl. 74—598)

The present invention relates to cranks.

Cranks such as those conventionally used in crank shafts include a crank shaft portion, a crank pin, and a web interconnecting the crank shaft portion and the crank pin. Where all of these components are integral with each other and made of one piece an extremely complex mold and casting operation is required. Furthermore, the crank shaft casting, particularly where it includes a relatively large number of webs and crank pins must be very carefully machined and balanced.

In order to overcome the above drawbacks it has already been proposed to provide a crank composed of a plurality of interconnected members, but these members have a press fit with respect to each other and some of the members are shrunken onto other members so that while it may be easier to assemble such a crank than to manufacture a one-piece crank of the type referred to above, it is extremely difficult to disassemble such a crank in order to replace worn parts thereof.

It is accordingly one of the objects of the present invention to provide a crank whose several components may be assembled together in such a way that when desired it is also possible to easily and quickly disassemble the entire crank so that worn parts thereof may be replaced, for example.

It is a further object of the present invention to provide a crank with a multipartite web whose components may be held by a manually operable means in assembled condition and may be easily and quickly disassembled.

Another object of the present invention is to provide a multipartite web of the above type which will simultaneously operate to fix the crank pin to the web.

It is also an object of the present invention to provide a multipartite web which will operate to fix the crank shaft to the web.

The objects of the present invention also include the provision of an exceedingly simple and rugged structure capable of accomplishing the above objects.

With the above objects in view the invention includes a crank composed of a crank pin, a crank shaft, and a web. In accordance with the present invention the web is multipartite and in accordance with the present invention a manually operable means is provided for holding the parts of the web in assembled condition. This manually operable means may be operated to disassemble the web when desired.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
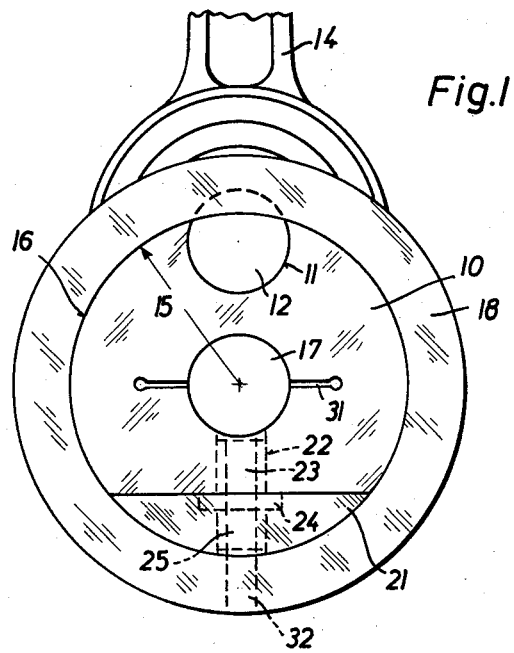
FIG. 1 is a side view of one embodiment of a crank according to the present invention.
Figure 2:
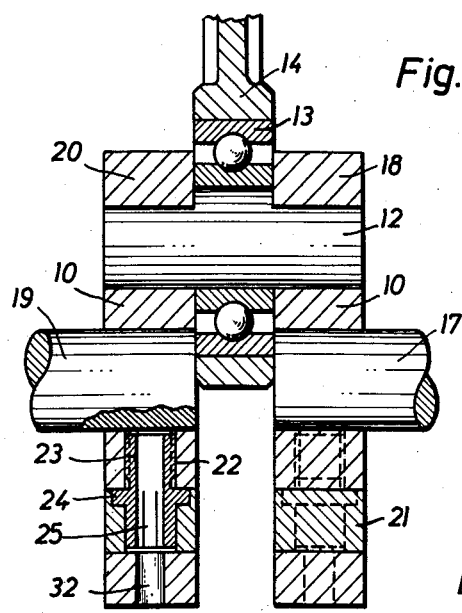
FIG. 2 is an axial section of the crank of FIG. 1.

Referring to FIGS. 1 and 2, the crank illustrated therein includes a pair of multipartite webs each of which includes a plate member 10 formed with an arcuate notch 11 at the circular periphery of the plate member 10. This arcuate notch 11 forms part of a cylinder which extends beyond the periphery of the plate member 10, and a crank pin 12 has between the plate members 10 (FIG. 2) a journal of the same size as an occupying the cylinder of which the arcuate notch 11 forms a part. In the notch 11 of each plate member 10 the crank pin 12 has an end portion which fills the notch and which has an exterior surface forming a continuation of the circular periphery of the plate member 10. A bearing 13 which may be a ball bearing (FIG. 2) surrounds and receives the journal of the crank pin 12, and a connecting rod 14 is connected with the bearing 13 in the manner shown most clearly in FIG. 2. The plate member 10 and the end portion of the crank pin 12 of each web are very accurately machined along the radius 15 indicated in FIG. 1 so that they form a continuous part of a circle 16. The lower edge of the plate member 10 is straight and extends along a secant of the circle 16, and a second plate member 21 is located against the straight peripheral portion of the plate member 10 and cooperates with the latter to form a complete circular plate. The plate member 10 is formed with an internally threaded diametral bore 22 and the plate member 21 is formed with a bore passing therethrough and forming a continuation of the bore 22, and at its end which is adjacent to the plate member 10 the bore of the plate member 21 has an annular enlargement receiving a collar 24 which is fixed integrally with an elongated screw member 23 having above the collar 24, as viewed in FIG. 2, a threaded portion in threaded engagement with the threaded bore portion 22. The elongated screw member 23 is formed with an axial bore 25 passing therethrough, and this bore 25 is non-circular at least at the lower portion thereof as viewed in FIG. 2. The plate formed by the plate members 10 and 21 is surrounded by a ring 18 which together with these plate members forms one of the multipartite webs, and the other web is formed by identical plate members 10 and 21 and a ring 20 identical with the ring 18. Both of these rings are respectively formed with bores 32 which form a continuation of the bores of the plate members 10 and 21 so that a suitable wrench may be inserted through the bore 32 of each web to engage the non-circular portion of the bore 25 so that each screw member 23 may be turned by the operator. By turning each screw member 23 so that the collar 24 thereof approaches the ring 18 or the ring 20, the plate members 10 and 21 of each web are urged apart from each other so as to press with their peripheries against the inner periphery of the ring 18 or the ring 20 and in this way the parts of the multipartite web are maintained in assembled condition. The urging of the plate members 10 and 21 apart from each other also causes the portion of the crank pin 12 in the notch 11 to be clamped between the plate 10 and the ring 18 or between the plate 10 and the ring 20 of the other web, and in this way the crank pin 12 is fixed with the web.

Each of the plates 10 is formed with a central opening, and in these central openings the plates 10 respectively receive the crank shafts 17 and 19. When the screw member 23 is turned so as to urge the plate members 10 and 21 apart from each other the material of each plate member 10 around its opening which receives the crank shaft will press against the crank shaft and slightly deformation of the material at this part of the plate member 10 will take place in order to fix the crank shafts 17 and 19 to the plate 10 of the pair of multipartite webs shown in FIG. 2. In order to enhance the clamping of the plate members 10 to the shaft 17 and 19, respectively, each plate member 10 is formed with a pair of diametrically opposed slots 31 communicating with the central opening of the plate member 10 and thus the urging of the plate members apart from each other by operation of the screw 23 will tend to close the slots 31, and cause the plate member 10 to tightly clamp the crank shaft.

Thus, it is clear that the screw 23 forms a manually operable means capable of being operated on by the operator for urging the plate members 10 and 21 apart from each other so as to maintain the components of the multipartite web in assembled condition and so as to fix the crank pin and crank shaft to the multipartite web of the crank of the invention. On the other hand it is possible by loosening the screw member 23 to quickly and easily disassemble the structure. Thus, by turning the screw 23 so that the collar 24 moves away from the outer ring of the web the pressure of the plate members of the web against the outer ring is released and the webs may then be slipped from the crank pin 12 and of course the webs may also be slipped from the crank shafts 17 and 19, respectively. Furthermore once the multipartite web is removed from the crank pin and crank shaft the plates 10 and 21 may be slipped out of the surrounding ring 18 or 20 and then these plates will very easily and quickly separate from each other simply by slipping of the plate member 21 from the screw member 23. Thus, it is possible to very quickly and easily replace any worn parts and the entire crank may then be quickly and easily reassembled. Of course, the bearing 13 is placed on the journal of the crank pin 12 before both of the multipartite webs of the invention are joined thereto in the manner indicated in FIG. 2.

Figure 3:
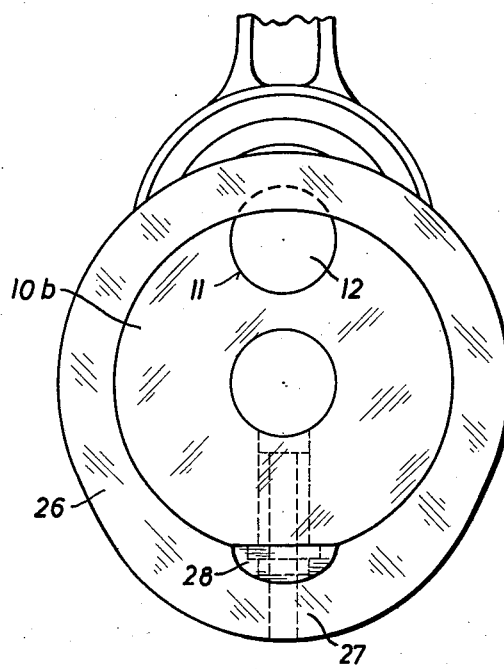
FIG. 3 is a side view of a second embodiment of a crank according to the present invention.

The embodiment of the invention which is illustrated in FIG. 3 is the same as that of FIGS. 1 and 2 except that the plate 10b of each multipartite web is almost a complete circle and the outer ring 26 of the web has a widened portion 27 formed at its inner periphery with a notch which receives the second plate 28 which replaces the plate 21. The plates 10b and 28 are capable of being urged apart from each other by the same manually operable means as that of FIGS. 1 and 2 so that the structure of FIG. 3 will produce the same result as that of FIGS. 1 and 2.

Figure 4:
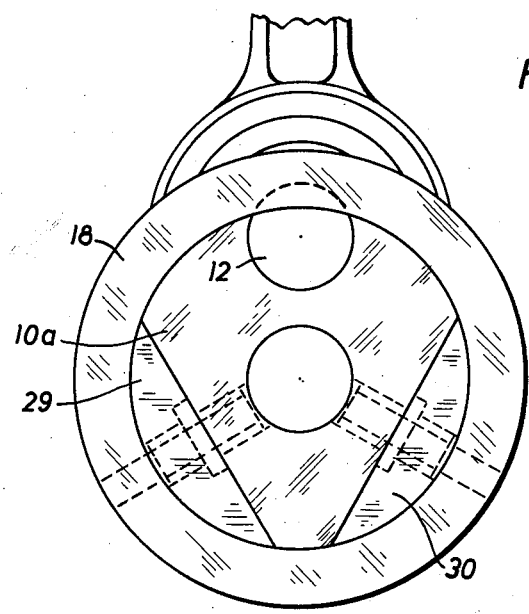
FIG. 4 is a side view of yet another embodiment of a crank according to the present invention.

It is of course not essential to limit the structure to a multipartite web which has an outer ring and only two plate members surrounded by the ring. Thus, FIG. 4 shows an arrangement identical with that of FIGS. 1 and 2 except that instead of only a pair of plate members for each web there are three plate members. Thus, the plate member 10a of FIG. 4 corresponds to the plate 10, and there are a pair of plate members 29 and 30 which form a complete circle with the plate 10a. Thus, as may be seen from FIG. 4, the plate which is surrounded by the ring 18 is formed into a complete circular plate by the cooperation of the plate members 29 and 30 with the plate member 10a, and a pair of the manually operable screw means are provided to cooperate with suitable bores as indicated in FIG. 4 so that each of the plate members 29 and 30 may be urged away from the plate member 10a to hold the parts assembled in a manner described above in connection with FIGS. 1 and 2.

With any of the above-described embodiments balancing may be carried out in any suitable well-known manner. For example, in the case of FIG. 3, the enlarged portion 27 of the ring 26 may be used as a balancing weight. Also, in the case of FIG. 2, although a ball bearing is shown, it is of course within the scope of the invention to use a needle bearing or even a plain bearing.

Figure 5:
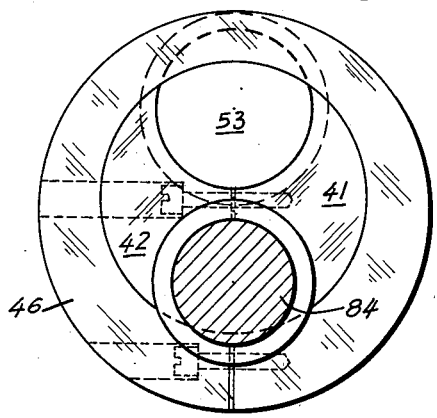
FIG. 5 shows in a side view a further embodiment of a crank according to the present invention, FIG. 5 being taken along line 5—5 of FIG. 7 in the direction of the arrows.
Figure 6:
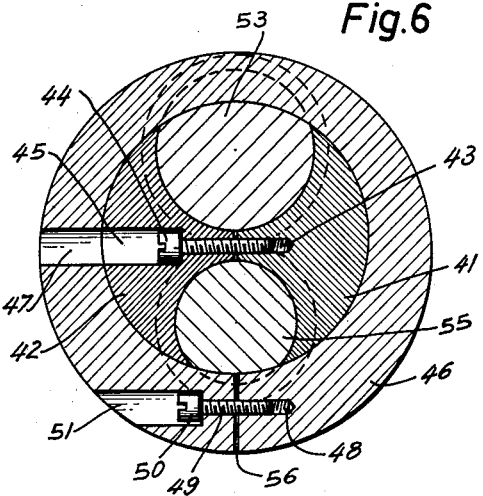
FIG. 6 is a transverse section taken along line 6—6 of FIG. 7 in the direction of the arrow.
Figure 7:
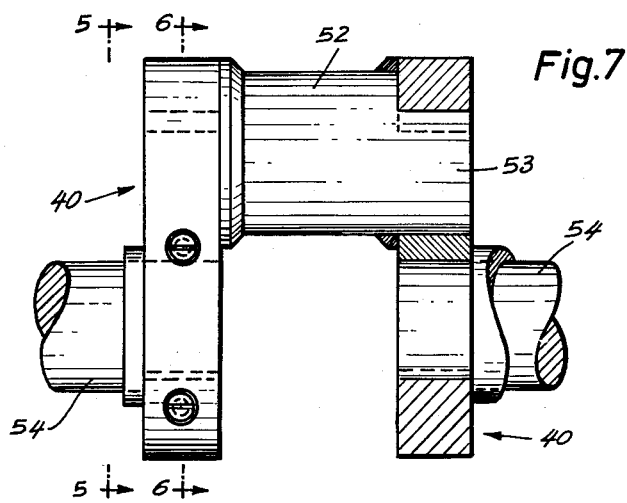
FIG. 7 is a partly sectional longitudinal elevation of the crank of FIGS. 5 and 6.

Referring to FIGS. 5–7, it will be seen, particularly from FIG. 7, that there are a pair of cranks interconnected with each other through the common crank pin 52. In addition to the crank pin 52 each of the cranks includes a multipartite web 40 and a crank shaft 54.

The multipartite web includes a circular plate made up of the plate members 41 and 42, the portion 53 of the crank pin 52 and the portion 55 of the crank shaft 54 as shown most clearly in FIG. 6. Thus, as may be seen from FIG. 6, the multipartite web includes the crank pin portion 53, the crank shaft portion 55, and the plates 41 and 42 all of which cooperate together to form a circular plate, and this circular plate is surrounded by the ring 46 of the multipartite web.

The plate 41 is formed with a threaded bore 43 and a screw 44 extends through an unthreaded bore of the plate 42 into the threaded bore 43. The screw 44 may be manually tightened so as to pull the plate members 41 and 42 toward each other into clamping engagement with the crank shaft portion 55 and the crank pin portion 53. The head of the screw 44 is located in an enlarged bore portion 45 of the plate member 42, and the ring 46 is formed with a bore 47 formed a continuation of the bore portion 45 so that the operator may introduce a screwdriver through the bores 47 and 45 to the screw 44 for turning the latter so as to tighten or loosen the connection between the plate members 41 and 42 and the crank pin end portion 53 and crank shaft end portion 54.

The ring 46 is split, as shown most clearly at 56 in FIG. 6, and one of the free ends of the ring 46 at the split 56 if formed with a threaded bore 48 while the other free end is formed with a coaxial unthreaded bore 49 having an enlarged portion 51. A screw member 50 has its head located in the enlarged bore 51 and passes freely through the bore 49 into threaded engagement with the threaded bore 48, so that by inserting a screwdriver through the bore 51 the operator may turn the screw 50 so as to tighten or loosen the grip of the split ring 46 on the plate of the web.

As is apparent from FIGS. 5–7, each of the end portions 53 of the crank pin 52 forms part of a cylinder, and the journal of the crank pin 52 is of the same size as and occupies this cylinder, this journal being located between the webs 40, as indicated in FIG. 7. The exterior surface of the end portion 53 of the crank pin forms a continuation of the circular peripheries of the plate members 41 and 42.

In the same way the end portion 53 of each crank shaft 54 forms only part of the cylinder of the crank shaft 54, and the exterior surface of the end portion 55 forms a continuation of the circular periphery of the plate members 41 and 42.

Thus, with the embodiment of FIGS. 5 and 6, by tightening the screw 44 it is possible to tightly clamp the end portions of the crank shaft and crank pin between the plate members 41 and 42, and then by tightening the screw 50 it is possible to tightly clamp the ring 46 around the members 41, 55, 42 and 53. Thus all of the components of the crank may be held together in assembled condition. In order to disassemble the crank it is only necessary to loosen the screws 44 and 50, and then the entire crank may be disassembled.

Thus, it will be seen that with the embodiment of FIGS. 5–7 the screw members 44 and 50 form a manually operable means for holding the parts in assembled condition and capable of being actuated by the operator for disassembling the parts.

It will be understood that each of the elements described above, or two or more together, may also find a useful application in other types of cranks differing from the types described above.

While the invention has been illustrated and described as embodied in cranks having multipartite webs, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A crank comprising, in combination, a crank shaft; a crank pin; a multipartite web engaging said crank pin and crank shaft, said web including a plurality of plate parts and a ring surrounding said plate parts; and manually operable means cooperating with said web for urging said plate parts away from each other and into engagement with said ring so as to fix said web to said crank pin and crank shaft, said manually operable means by fixing said web to said crank pin and crank shaft releasably holding the parts of said web in assembled condition so that said manually operable means may be actuated by the operator for simultaneously disassembling said web and disconnecting the same from the crank pin and the crank shaft.

2. A crank comprising, in combination, a crank pin; a crank shaft, a multipartite web operatively connected with said crank pin and crank shaft, said web including a plurality of plate parts and a ring surrounding said plate parts; and manually operable screw means cooperating with said web for urging said plate parts away from each other and into engagement with said ring so as to fix said web to said crankpin and crank shaft, said manually operable means by fixing said web to said crankpin and crank shaft releasably holding the parts of said web in assembled condition, so that said manually operable screw means may be actuated by the operator for simultaneously disassembling said web and disconnecting the same from said crank pin and crank shaft.

3. A crank comprising, in combination, a crank pin; a crank shaft; a multipartite web operatively connected with said crank pin and crank shaft; and manually operable screw means cooperating with said web for fixing the same to said crank pin and crank shaft, said manually operable means by fixing said web to said crankpin and crank shaft; releasably holding the parts of said web in assembled condition, so that said manually operable screw means may be actuated by the operator for simultaneously disassembling said web and disconnecting the same from said crankpin and crank shaft, said multipartite web including a pair of plate members together forming part of a circular plate and a ring surrounding and engaging the periphery of said plate members, said screw means urging said plate members away from each other and into engagement with said ring.

4. A crank comprising, in combination, a web including a multipartite circular plate and a ring surrounding said plate and having an inner periphery engaging the exterior periphery of said circular plate, said circular plate being formed at its peripheral portion with an arcuate notch forming part of a cylinder which extends beyond the periphery of said circular plate and which has an axis parallel to that of said circular plate; a crank shaft fixed to said circular plate; a crank pin having a journal of the same size as and occupying said cylinder, said crank pin having an end portion extending into said notch and having at the periphery of said plate an arcuate portion forming a continuation of the circular periphery of said plate and engaging the inner periphery of said ring; and manually operable means cooperating with the parts of said multipartite circular plate for urging said parts away from each other into engagement with the inner periphery of said ring for maintaining the parts in assembled condition, said manually operable means by urging said parts into engagement with the inner periphery of said ring clamping said crank pin between said plate and ring for fixing said crank pin to said web, whereby said manually operable means may be actuated in order to disassemble the web and simultaneously disconnect the same from the crankpin and the crank shaft.

5. A crank comprising, in combination, a multipartite web including first and second plate members engaging each other and together forming a circular plate and a ring surrounding and having an inner periphery engaging the exterior periphery of said plate, said first plate member being formed at its periphery with an arcuate notch forming part of a cylinder which extends beyond the periphery of said plate; a crank shaft fixed to one of said plates; a crank pin having a journal of the same size as and occupying said cylinder and having an end portion located in said notch and forming a continuation of the exterior periphery of said plate so that said crank pin engages the inner periphery of said ring; and manually operable means cooperating with said first and second plate members for urging them apart from each other so as to press their peripheries against said ring, said manually operable means by urging said plate members apart simultaneously pressing the end portion of said crank pin against said ring for maintaining the web and crank pin connected to each other and for simultaneously maintaining the parts of the web in assembled condition, whereby said manually operable means may be actuated to disassemble the web and simultaneously to disconnect the crank pin from the web.

6. A crank comprising, in combination, a multipartite web including first and second plate members engaging each other and together forming a circular plate and a ring surrounding and having an inner periphery engaging the exterior periphery of said plate, said first plate member being formed at its periphery with an arcuate notch forming part of a cylinder which extends beyond the periphery of said plate; a crank shaft fixed to one of said plates; a crank pin having a journal of the same size as and occupying said cylinder and having an end portion located in said notch and forming a continuation of the exterior periphery of said plate so that said crank pin engages the inner periphery of said ring, said first and second plate members and said ring being formed with a bore which extends continuously through a portion of said ring, the plate member next to said portion of said ring, and into the other plate member; the bore portion in said other plate member being threaded and the bore portion in said plate member next to the bored portion of said ring being stepped so as to have an enlarged annular portion; and an elongated screw member located in the bore portions of said plate members, threadedly engaging the bore portion of said other plate member, having a shoulder located in said enlarged annular portion, and having an internally bored free end accessible through the bore portion of said ring so that said screw member may be turned for applying said shoulder against said plate member next to said bore portion of said ring for urging said plate members apart from each other to press their peripheries against said ring and thus maintain the web in assembled condition, said screw member by urging said plate members apart simultaneously clamping the crank pin between said first plate member and said ring.

7. A crank comprising, in combination, a first plate member forming more than one-half of a circular plate and a second plate member located next to said first plate member and forming the remainder of said circular plate, said first plate member being formed at its periphery with an arcuate notch forming part of a cylinder parallel to the axis of said plate and extending beyond the periphery thereof, said first plate member being formed at the center of said plate with an opening and with a pair of relatively narrow diametrically opposed slots communicating with and extending from said opening, and said first plate member being formed with a threaded bore extending from said opening to said second plate member, the latter being formed with a bore which forms a continuation of said bore of said first plate member and which has an enlarged annular portion next to said first plate member; a ring surrounding and engaging the circular periphery of said plate, said ring being formed with a bore which forms a continuation of said bore of said second plate member; a crank shaft located in said opening of said first plate member and engaging said first plate member; a crank pin having a journal of the same size as and occupying said cylinder and having an end portion located in said arcuate notch and having an arcuate exterior portion forming a continuation of the circular periphery of said first plate member and engaging the inner periphery of said ring; and an elongated screw member located in said bores of said first and second plate members, threadedly engaging said first plate member, having a collar in said enlarged annular portion of said bore of said second plate member and being formed with a non-circular bore accessible through said bore of said ring so that with a suitable wrench said screw member may be turned in one direction to press said plate members against the inner periphery of said ring for fixing said shaft to said first plate member and simultaneously by so pressing said plate members against the inner periphery of said ring for clamping said pin between said first plate member and said ring and in an opposite direction for disassembling the crank.

8. A crank comprising, in combination, a first plate member forming almost a complete circle, having at one side a straight peripheral edge portion and being formed at an opposite side with an arcuate notch, the surface of which forms part of a cylinder which if completed would extend beyond the periphery of said first plate member and which has an axis parallel to that of said first plate member; a ring surrounding and engaging the circular periphery of said first plate member, said ring being formed at said straight portion of the periphery of said first plate member with an arcuate notch at the inner periphery of said ring; a second plate member in said arcuate notch of said ring and engaging said straight peripheral portion of said first plate member, said ring having a larger size at the portion thereof formed with said notch; a crank shaft fixed to said first plate member substantially at the center thereof; a crank pin having a journal of the same size as and occupying said cylinder if the same were completed and having an end portion located in said arcuate notch of said first plate member and having an exterior arcuate surface forming a continuation of the periphery of said first plate member and engaging the inner periphery of said ring; and manually operable means cooperating with said first and second plate members for urging the same apart from each other so as to maintain said plate members and ring in assembled condition, said manually operable means by urging said plate members apart from each other simultaneously clamping said crank pin between said first plate member and said ring, whereby said manually operable means may be actuated to disassemble said plate members and ring and simultaneously to disconnect the same from said crank shaft and said crank pin.

9. A crank comprising, in combination, a multi-partite web including a circular plate made up of at least three plate members cooperating with each other to form the circular plate, one of said plate members being formed at its periphery with an arcuate notch, the surface of which forms part of a cylinder parallel to the axis of the circular plate and which if completed would extend beyond the periphery thereof; a crank shaft fixed to one of said plate members; a crank pin having a journal equal in size to and occupying said cylinder if the same were completed and having a free end portion extending into said arcuate notch and having an outer surface forming a continuation of the circular periphery of said plate; and means cooperating with said plate members for urging the same apart from each other into engagement with said ring so as to maintain the multipartite web in assembled condition said means by urging said plate members into engagement with said ring clamping said crank pin between said one plate member and said ring, said means being manually operable so that said multipartite web may be disassembled and said crank pin and said crank shaft simultaneously disconnected.

10. A crank comprising, in combination, a portion of a crank pin, a portion of a crank shaft, and a pair of plate members all cooperating together to form a circular plate, said plate members being separated from each other between said crank pin portion and said crank shaft portion; first manually operable screw means cooperating with said plate members to pull them toward each other so as to press the plate members against said crank shaft portion and crank pin portion; a split ring surrounding and engaging the periphery of the plate formed by said plate members and said crank shaft portion and crank pin portion; second manually operable screw means cooperating with said split ring for tending to contract the latter and urge the inner periphery thereof against the exterior periphery of said plate; a crank pin including said crank pin portion and having a journal located beyond said crank pin portion, said journal forming a cylinder and said crank pin portion having a non-circular cross-section smaller than that of said journal; and a crank shaft including said crank shaft portion and extending beyond the latter and having beyond said crank shaft portion a circular cross-section, said crank shaft portion having a non-circular cross-section smaller than said circular cross-section of said crank shaft, said first and second screw means cooperating respectively with said plate members and said split ring for fixing the same to said crank pin and said crank shaft and thereby releasably holding said plate members and said split ring in assembled condition so that said screw means may be actuated by an operator for simultaneously disassembling said plate members and said split ring and disconnecting the same from the crank pin and the crank shaft.

References Cited in the file of this patent

UNITED STATES PATENTS

| 250,404 | Syversen | Dec. 6, 1881 |
| 775,764 | Pugh | Nov. 22, 1904 |
| 870,502 | Fay et al. | Nov. 5, 1907 |
| 1,373,345 | Miller | Mar. 29, 1921 |
| 1,547,214 | Gooding | July 28, 1925 |
| 1,830,976 | Ashworth | Nov. 10, 1931 |
| 2,475,011 | Chilton | July 5, 1949 |
| 2,919,602 | Spraragen | Jan. 5, 1960 |
| 3,023,034 | Chung | Feb. 27, 1962 |

FOREIGN PATENTS

| 4,389 of 1895 | Great Britain | July 27, 1895 |
| 133,393 | Austria | May 26, 1933 |
| 398,380 | Great Britain | Sept. 14, 1933 |
| 515,822 | France | Nov. 29, 1920 |